Dec. 22, 1964  F. A. DICKSON ETAL  3,162,330
TRANSPORTABLE CONTAINER
Filed Sept. 25, 1961  4 Sheets-Sheet 1

INVENTORS
FRANCIS ANDERSON DICKSON
PETER TERRICK STAINFORTH
BY Cushman, Darby & Cushman
ATTORNEYS Dec. 22, 1964  F. A. DICKSON ETAL  3,162,330
TRANSPORTABLE CONTAINER
Filed Sept. 25, 1961  4 Sheets-Sheet 2

INVENTOR
FRANCIS ANDERSON DICKSON
PETER TERRICK STAINFORTH

BY Cushman, Darby & Cushman
ATTORNEYS though for some uses greater distances, e.g. up to six inches or more may be used.

United States Patent Office 3,162,330
Patented Dec. 22, 1964

3,162,330
TRANSPORTABLE CONTAINER
Francis Anderson Dickson, Harpenden, and Peter Terrick Stainforth, Knebworth, England, assignors to Imperial Chemical Industries Limited, London, England, a corporation of Great Britain
Filed Sept. 25, 1961, Ser. No. 140,295
Claims priority, application Great Britain, Sept. 28, 1960, 33,286/60; Oct. 13, 1960, 35,119/60
9 Claims. (Cl. 222—183)

This invention relates to improvements in transportable containers, particularly to containers for transporting powdery or granular materials in bulk.

Various containers have been devised for transporting powdery or granular materials in bulk, e.g. in lots of one ton or more. In all cases, however, there have been disadvantages in the methods required for emptying these containers, e.g. by requiring special mechanical facilities for handling the containers, or these containers have been difficult to clean out.

It is an object of this invention to provide transportable containers that can be emptied and cleaned easily, and are simple to construct and handle. It is a further object to provide such containers which are relatively light but at the same time strong and resilient.

According to the present invention we provide a container for transporting granular or powdery materials in bulk which comprises a substantially rectangular box-like containing-vessel of at least 30 cubic feet capacity having four generally flat sides and one end convergent to form an aperture, said vessel being formed from a resilient impact resistant thermoplastic organic polymeric material, and the vessel being wholly contained within a rigid metal framework, said framework being provided with supporting members at each end to provide supporting surfaces on which the container can stand with the convergent end pointing up or pointing down, the framework in the region of the convergent end being provided additionally with horizontal flat surfaces on either side of said convergent end and spaced vertically above the supporting surfaces of the supporting members at said convergent end when the vessel is in position with the convergent end downwards, to provide downwardly directed lifting surfaces for engagement with a lifting device having horizontal lifting arms. By the term "horizontal" as applied to the container it is to be understood that we mean the horizontal position when the container is supported on one of its supporting surfaces.

Figure 1:
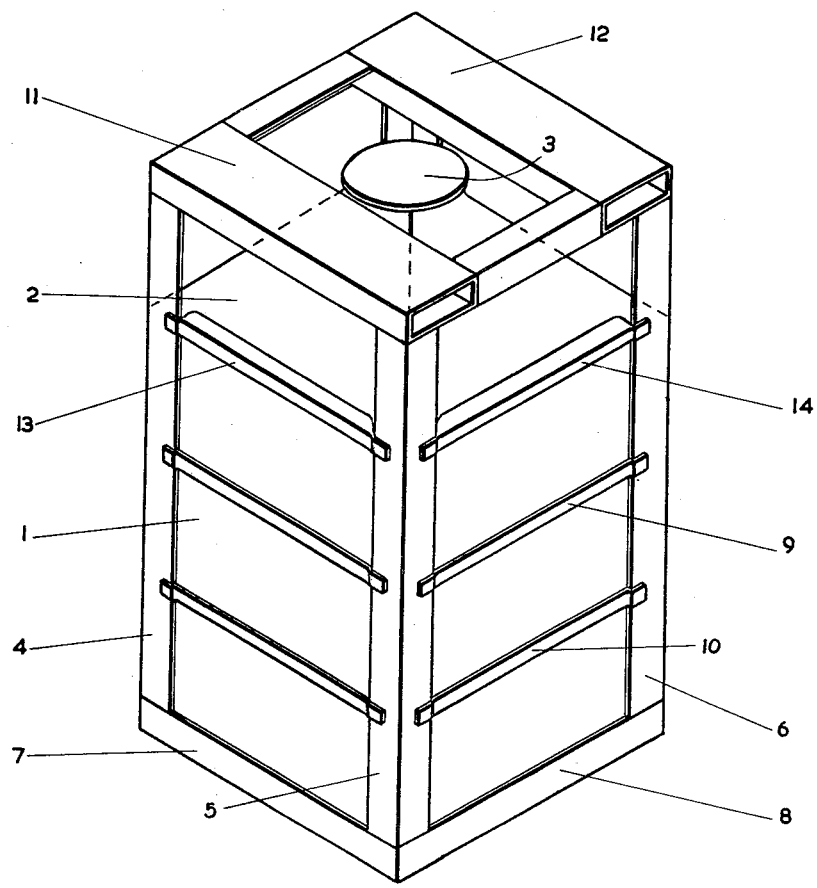
Figure 2A:
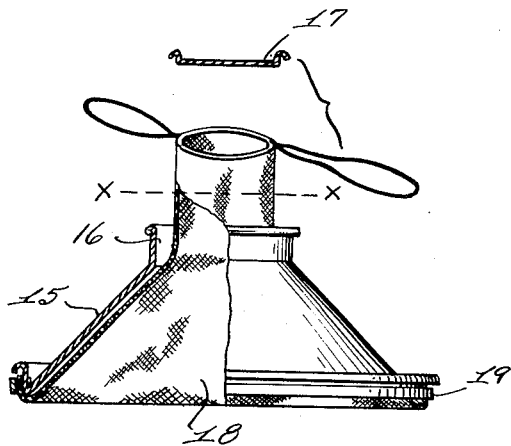
Figure 2B:
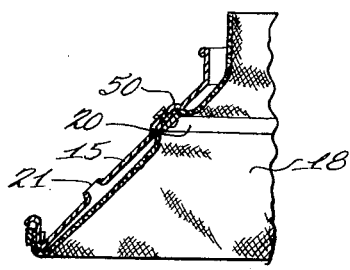
Figure 3A:
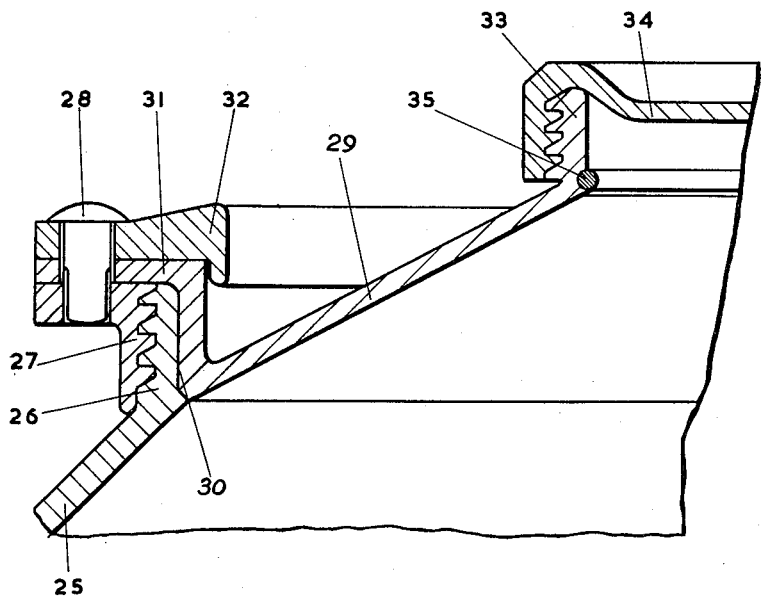
Figure 3B:
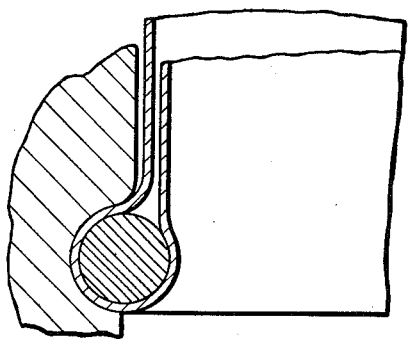
Figure 4A:
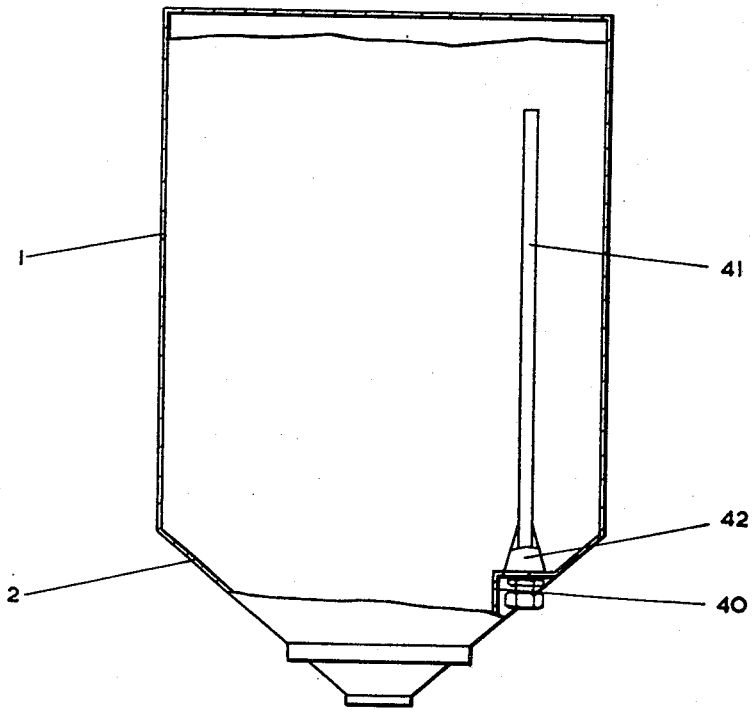
Figure 4B:
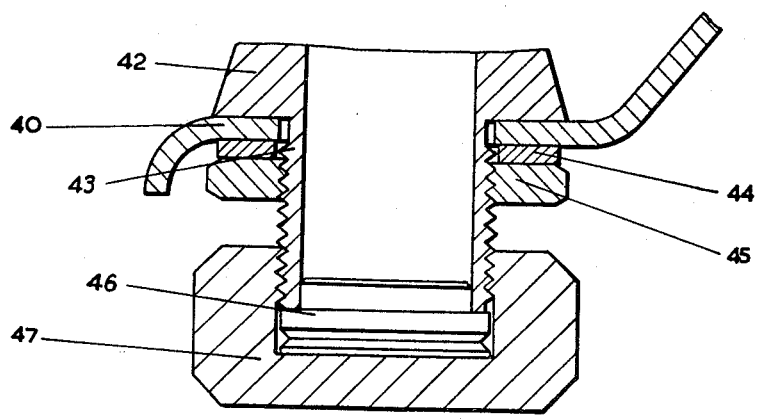

In order that our invention may be more easily understood one embodiment will be described with reference to the attached drawing FIGURES 1, 2a, 2b, 3a, 3b, 4a and 4b. FIGURE 1 is a perspective view of the apparatus, FIGURES 2a and 2b illustrate one form of valve closure cover, FIGURES 3a and 3b illustrate a second form of valve closure, and FIGURES 4a and 4b illustrate details of a sampling device. FIGURE 1 illustrates the container in the position in which it is filled. After filling the container is inverted and transported in the inverted position.

The container 1 is made from polythene by normal moulding methods and it has a flat base, four flat sides which converge at the top to form a funnel-like top 2 which is a pyramid-like extension of the four flat sides, with a circular aperture 3. The container is held within a rigid steel framework made up from the vertical edge pieces 4, 5 and 6, the bottom pieces 7 and 8, and the supporting strips on the sides 9 and 10. The pieces forming the framework extend beyond the flat sides to surround the funnel-like part 2 and this part of the framework is terminated by two parallel open-ended hollow tube-like members 11 and 12, each of which has a rectangular section. All the components of the frame are welded together.

13 and 14 are angle pieces attached to the frame so that one face bears against a flat side of the container, and the other face bears against the funnel-like face thereby locking the container within the frame and preventing any vertical movement of the container within the frame. After filling and sealing, the container is inverted so that it stands on the pieces 11 and 12 which provide a base for the container to stand on and also to provide recesses to receive the arms of a fork lift truck or other lifting device when the container has to be moved.

If heavy powdered materials are to be carried, we prefer that the walls of the container be stiffened by vertical corrugations, and that the retaining framework should consist of vertical tubes or bars located within the corrugations of the container, thereby further reinforcing the sides. The vertical tubes or bars terminate at their upper ends in a horizontal framework of intersecting tubes and bars, which are themselves recessed into the flat base thereby adding reinforcement to that part of the container, and at their lower ends in a rectangular section shelf on which the conical part of the container sits. The container is thus locked between the upper framework and the lower shelf section, thus preventing vertical movement within the frame. The rectangular shelf section forms the upper portion of the carrying or stillage part of the framework which is also of welded tubular construction. In practice we find that this is to be preferred since it is light, strong, and simple to produce.

Alternative means may be provided to form the lifting surfaces. Instead of the rectangular tube-like members, feet may be provided at the four corners in which case the framework carrying the feet will provide the lifting surfaces. It is important that the distance between the plane containing the supporting surfaces of the supporting members at the convergent end, i.e. the actual surface of the framework which rests on the factory floor and the plane containing the lifting surfaces should be sufficient to enable the arms of the lifting device to be inserted and that there should be no obstructions preventing the passage of the lifting arm from one side of the framework to the other. The distance between the planes need not be more than about one inch, although for design purposes greater distances, e.g. up to six inches or more may be used.

These containers are intended for the transportation of granular or powdery materials in bulk. To achieve this purpose and to avoid the disadvantage of having containers that are too large to handle easily, we prefer that the container should be capable of holding about one ton of material. Containers having base dimensions (i.e. width of side) of from 2 to 4 feet and height of from 4 to 7 feet are particularly useful.

The size of the opening 3 should be sufficient to allow filling and emptying to proceed easily, and also to allow the container to be cleaned without difficulty. For cleaning purposes we prefer that the opening should be not less than 18 inches in diameter to allow a man to enter. To facilitate emptying the container while keeping the flow of material under control, it may be desirable to include a valve in the closing device. The closing device may, therefore, be a lid clamped over the opening by conventional means into which a valve is fitted so that emptying can take place without removing the lid. For example, the closing device can itself have an opening fitted with a lid and a flexible tube attached to the opening, the tube lying within the container when the lid is in position. The tube can be made for example of fabric, thermoplastic film, rubber, or rubber fabric, and can be fitted with a cord or like means to keep it closed. In order to allow material to flow from the container the small lid is first removed and the flexible tube allowed to protrude from the container. Flow of material is then controlled by loosening or tightening the cord.

Alternatively a valve may be used of the type illustrated in FIGURES 2a and 2b of the attached drawings. The valve shown in FIGURE 2a is made from aluminium and is in the form of a cone with its bottom edge turned back so that it can fit into a steel ring held in the opening 3 of the container. The top part of the conical valve consists of an aperture 16 into which a lid 17 can be fitted. On the inside of the conical lid there is fitted a flexible fabric "sock" valve. The lower end of the sock is attached to the cone 15 by means of an aluminium collar 19 which encircles the unturned bottom edge of the cone. The top of the fabric sock is fitted with a cord which can be pulled tight to seal the valve and tied at XX.

A particularly useful form of closure is illustrated in FIGURES 3a and 3b. This closure is a truncated cone which is adapted to fit on to the opening of the container and to be retained in position during transportation. This means that the opening of the container (3 in FIGURE 1) is formed at a height such that when the cone closure is fitted, the closure is contained within the framework. FIGURE 3a is a part elevational section through the opening of the container and the cone fitting. The wall of the container is shown at 25 terminating in a threaded opening 26. On to the threaded opening is screwed the cast aluminium alloy ring 27. This ring has a flange with threaded holes to receive a screw 28.

The cone fitting is shown at 29 and can be made from the same material as the container. Its lower edge has a cylindrical face to mate with the cylindrical surface of the opening of the container. It will be appreciated that the mating surfaces 30 could if desired be frusto-conical. The lower edge of the cone also has a flange 31 which has holes corresponding with those on flange 28. The cone fitting is secured in position by the die cast aluminium alloy ring member 32 which carries holes corresponding with those in the flanges 28 and 31 with which it is secured to the ring 27 by means of screws 28.

The upper part of the cone fitting terminates in a circular opening bounded by the cylindrical externally threaded projection 33. On to this is screwed the cap 34. The cone fitting is also provided with a sock type valve. In this embodiment this takes the form of a piece of polythene tubular film (or other strong tubular material) folded back on itself round the steel ring 35 to form a double walled tube as shown in FIGURE 3b. The steel ring carrying the tube is pressed into the recess in the cone fitting as shown. The open end of the polythene tube can be tied with a cord to provide a closure when the cap 34 is removed.

In addition to aluminium or a light aluminium alloy the conical valve can be made of any other suitable material e.g. another metal or a plastic material e.g. polythene, nylon or polypropylene or a rubber/resin mixture.

If the container neck and conical end fitting are each moulded from a thermoplastic organic polymeric material we prefer to secure the truncated conical end fitting to the neck of the container by means of a conventional drum lid closure band. This may be done for example by omitting the threaded ring 27 shown in FIGURE 3a and providing the parts 26 and 31 of the container and conical end fitting respectively with cylinder surfaces of the same diameter and preferably bevelled edges, round which the closure band can be fixed. We also prefer that the top inner edge of the container opening be recessed and an O-ring of soft rubber or of synthetic rubber be placed in the recess so that it is held under radial compression when the truncated conical end fitting is held in position by the closure band.

To assist the flow of powder or granules from the container through the valve it may be convenient to fluidise the material by blowing air through it as it enters the fabric valve. This may be done by attaching the fabric sock to the cone so that there is continuous attachment round the cone along two separately spaced regions, so that the areas of the cone and the fabric between these regions form a closed chamber into which air under pressure may be introduced through an opening in the cone, the pressure being such that the air is forced through the interstices of the fabric and into the powdery or granular material. FIGURE 2b illustrates an arrangement of this kind. The cone 15 has a continuous recess 50 parallel to its base, and the fabric sock 18 is attached to this recess by an aluminium ring 20, as well as being attached to the base of the cone. The cone has an aperture 21 which can be connected to a source of air under pressure.

If it is desired to remove small samples of the contents of our container this may be achieved in a particularly simple manner. The sampling arrangement is illustrated in FIGURES 4a and 4b where the convergent wall of the container is provided with an opening in a recessed part of said convergent wall and said opening has attached thereto a tube extending vertically into said container and is provided with a closure at the opening at said wall.

In FIGURE 4a, the container 1 is shown without its supporting framework. The convergent end 2 has the recessed portion 40 which has a circular opening to which the sampling tube 41 is attached. The method by which the sampling tube is attached to the container is shown in more detail in FIGURE 4b. The sampling tube has a thickened cone-like lower end 42, the lower surface of which rests on the inner horizontal surface of the recessed part 40. Below the cone-like lower end 42 the tube has a threaded extension which passes through the hole in the container. The tube is held in place by the screw ring 45; 44 is a rubber washer.

The lower end of the tube is closed by plug 46 and the screw cap 47. The sampling tube, its securing ring, plug and cap may be made of any convenient material. A particularly useful material from which these fittings may be made is polythene.

Tubes of any desired height may be fitted into our containers. The tube may also be used to fill the container with an inert gas where this may be desired to protect any material held in the container. By having a tube that extends almost to the full height of the container, it is possible to use the device to assist in discharging materials that flow with difficulty. This may be done by connecting the lower end to a source of gas pressure and pressurising the contents of the container.

The tube may be attached to the container in any convenient manner, and in general this is most usefully effected by providing the tube with a thickened portion (e.g. the conical portion 42 in FIGURE 4a) which bears against the inner surface of the recessed part and a ring screwed on to the threaded end of the tube that extends outside the container.

The sides of the convergent end of the container need not be almost wholly flat as described in the specific embodiment. As the sides converge to the opening they may be curved so that the funnel becomes conical rather than pyramidal. The opening can be of any convenient shape. For example, where the sides of the funnel are mainly flat it may be preferred to allow the opening to be rectangular and thereby avoid the need for curving the sides as when a circular opening is used. The substantially flat sides of the container need not meet at right angles, since it may be convenient for constructional purposes to use other shapes at the edges, e.g. curved or flattened edges, provided that the main part of each of the four vertical sides is flat. It is to be understood that the sides of the container may be formed with ribs to increase their rigidity.

In some instances it may be desired to lift our containers by means of an overhead lifting device, and for this lugs can easily be fixed on the four corners remote from the convergent end, or in any other suitable place.

Examples of resilient impact-resistant polymeric materials from which our containers may be made include polythene, polypropylene, nylon, laminates of polyvinyl chloride and glass fibre/polyester laminates, and the high impact strength rubber/resin compositions e.g. mixtures of butadiene/acrylonitrile copolymer rubbers and styrene/acrylonitrile resins. The container can consist of a single thickness of one of these materials or it can be formed from a plurality of layers of these materials. The latter form may be preferred where it is desired to include colouring materials, light stabilising materials or other ingredients into e.g. the outer layer but not the inner layer. The framework can be made from any convenient metal e.g. galvanized steel, stainless steel or a light aluminium alloy.

The combination of a containing vessel made from a resilient, impact resistant thermoplastic organic polymeric material supported in a rigid metal frame provides many advantages. Such a container is relatively light, cheap to make and easy to clean. Also, it makes possible the transportation of powdery and granular materials in bulk from the producing factory to the place where the contents are to be used.

We claim:

1. A container for transporting granular and powdery materials in bulk which comprises: a substantially rectangular box-like vessel having four generally flat sides and one end convergent to form an aperture, said vessel being formed from a resilient impact resistant thermoplastic organic polymeric material and the vessel being wholly contained within a rigid metal framework having supporting surfaces at each end, the framework in the region of the convergent end having additional supporting surfaces on either side of the convergent end for engagement with the horizontal lifting arms of a lifting device when the container is in position with the convergent end downwards, and the aperture of said container being closed by a truncated cone-like fitting removably secured to said aperture and provided with a closure and also provided with an internal sock-type valve, the cone-like fitting and closure being wholly contained within said framework.

2. A container for transporting granular and powdery materials in bulk comprising: a substantially rectangular box-like vessel of at least 30 cubic feet capacity having four generally flat sides and one end convergent to form a circular aperture of at least 18 inches, said vessel being formed from a resilient impact resistant thermoplastic organic polymeric material; a truncated cone-like fitting removably secured at its large end to the periphery of said aperture; a closure member removably secured to the smaller end of said fitting; a sock-type valve within said fitting; an external open metal framework engaging portions of said sides and of said convergent end and wholly surrounding said vessel, fitting and closure member whereby said container may stand with said convergent vessel end pointing up or down, said framework in the region of said convergent vessel end having rigid support members defining a flat surface parallel to said supporting surfaces on either side of said convergent end for engagement with the horizontal lifting arms of a lifting device.

3. A container as in claim 2 in which said support means includes two parallel open-ended hollow tube-like rigid members of rectangular cross-section, said members forming the end of said framework nearest said convergent vessel end whereby the exterior of said members provides a base for the container to stand on with said convergent end downwards and whereby the interior of said members may receive the lifting arms of a lifting device.

4. A container as in claim 2 wherein said sock-type valve includes: a flexible open-ended tube having a diameter at its inner end of about the same size as said vessel aperture and being sealed along the outer periphery of said inner end to the wall of said fitting, said tube being of sufficient length to allow its outer end to be extendable through the smaller end of said fitting; and means for closing off said tube near its outer end.

5. A container according to claim 1 in which the vessel is made from polythene.

6. A container according to claim 1 in which the vessel is made of a material selected from the group consisting of polypropylene, nylon, laminates of polyvinylchloride and glass fibre/polyester laminates, and high impact strength rubber/resin compositions.

7. A container according to claim 1 having a sampling device comprising a tube extending vertically into the vessel and from a recessed part formed in the sloping part of said convergent end, said recessed part having a circular horizontal opening through which said tube passes, securing means holding the tube fixedly to said recessed part, and a screw cap being provided to close the external open end of said tube.

8. A container according to claim 7 in which said tube is attached to said recessed part by a thickened portion which bears against the inner horizontal surface of the recessed part and a ring screwed on to the threaded end of the tube projecting externally of said recessed part.

9. A container according to claim 7 in which said tube is made from polythene.

References Cited by the Examiner
UNITED STATES PATENTS

| | | | |
|---|---|---|---|
| 2,400,955 | 5/46 | Samel | 222—464 X |
| 2,808,968 | 10/57 | House | 222—527 X |
| 2,862,645 | 12/58 | Page et al. | 222—184 X |
| 3,042,271 | 7/62 | Winstead | 222—183 X |
| 3,083,879 | 4/63 | Coleman | 222—185 X |

LOUIS J. DEMBO, *Primary Examiner.*

RAPHAEL M. LUPO, *Examiner.*